(12) United States Patent
Ballard et al.

(10) Patent No.: US 8,370,574 B2
(45) Date of Patent: Feb. 5, 2013

(54) SYSTEM AND METHOD FOR STORING CONFIGURATION DATA OF A STORAGE AUTOMATION DEVICE

(75) Inventors: Curtis Ballard, Fort Collins, CO (US); Colette Howe, Fort Collins, CO (US); Stanley Feather, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1294 days.

(21) Appl. No.: 11/451,810

(22) Filed: Jun. 13, 2006

(65) Prior Publication Data

US 2006/0294305 A1 Dec. 28, 2006

Related U.S. Application Data

(63) Continuation-in-part of application No. 10/611,597, filed on Jun. 30, 2003, now Pat. No. 7,085,884.

(51) Int. Cl.
*G06F 12/00* (2006.01)

(52) U.S. Cl. ............................. 711/115; 711/4; 711/100

(58) Field of Classification Search ........................ None
See application file for complete search history.

(56) References Cited

U.S. PATENT DOCUMENTS

| | | | |
|---|---|---|---|
| 3,801,963 A | 4/1974 | Chen | |
| 4,152,134 A | 5/1979 | Dowling | |
| 4,559,616 A | 12/1985 | Bruder | |
| 5,438,844 A | 8/1995 | Hoglund | |
| 5,542,082 A | 7/1996 | Solhjell | |
| 5,596,708 A | 1/1997 | Weber | |
| 5,767,647 A | 6/1998 | Akiyama | |
| 5,812,859 A | 9/1998 | Kamimaki | |
| 5,973,919 A | 10/1999 | Larabell | |
| 6,040,186 A | 3/2000 | Lewis et al. | |
| 6,056,921 A | 5/2000 | Rao et al. | |
| 6,124,993 A | 9/2000 | Hallamasek | |
| 6,143,573 A | 11/2000 | Rao et al. | |
| 6,236,626 B1 | 5/2001 | Nagai | |
| 6,256,967 B1 | 7/2001 | Hebron | |
| 6,263,387 B1 * | 7/2001 | Chrabaszcz | 710/302 |
| 6,343,324 B1 * | 1/2002 | Hubis et al. | 709/229 |
| 6,426,225 B1 | 7/2002 | Lewis et al. | |
| 2004/0059844 A1 * | 3/2004 | Jones et al. | 710/15 |
| 2004/0059901 A1 * | 3/2004 | Miller et al. | 713/1 |
| 2004/0117463 A1 * | 6/2004 | Reister | 709/220 |
| 2004/0139094 A1 * | 7/2004 | Tyndall et al. | 707/100 |
| 2004/0143703 A1 * | 7/2004 | Emberty et al. | 711/115 |
| 2004/0268039 A1 | 12/2004 | Ballard et al. | |
| 2005/0132178 A1 * | 6/2005 | Balasubramanian | 713/1 |

FOREIGN PATENT DOCUMENTS

EP 0430453 A2 6/1991

* cited by examiner

*Primary Examiner* — Kaushikkumar Patel

(57) ABSTRACT

A cartridge storage system has at least one peripheral device that controls access to a system component of the storage system and memory storing configuration data indicative of a configuration of the peripheral device. The system further has logic that automatically configures a replacement peripheral device of the at least one peripheral device based upon the stored configuration data.

20 Claims, 5 Drawing Sheets

SYSTEM AND METHOD FOR STORING CONFIGURATION DATA OF A STORAGE AUTOMATION DEVICE

CROSS REFERENCE TO RELATED APPLICATION

This application is a continuation-in-part of and claims priority to U.S. patent application Ser. No. 10/611,597, entitled "System and Method for Storing Operational Data of a Storage Automation Device to a Removable Nonvolatile Memory Component," and filed on Jun. 30, 2003 now U.S. Pat. No. 7,085,884, which is incorporated herein by reference.

BACKGROUND OF THE DISCLOSURE

1. Field of the Disclosure

The present disclosure relates generally to the field of data storage systems, and more particularly to a system and method for storing configuration data of a storage automation device in a removable nonvolatile memory component (RNMC).

2. Related Art

Storage automation systems, e.g., data cartridge storage systems, typically include a host computer and a data storage device. The data storage device typically comprises a cartridge storage element, input/output components, and a moveable cartridge access component, sometimes referred to as a "picker." The cartridge storage element stores a plurality of data cartridges in an array, and each data cartridge in the array has an associated storage position within the cartridge storage element.

During operation, the data storage device may receive, from the host computer, a request for retrieval of a specified data cartridge. The storage device determines, based on the request received from the host computer, a data cartridge position for the requested data cartridge. The movable cartridge access device then moves to that position, retrieves the requested cartridge from the cartridge storage element, moves to the position of an input/output component, for example, a data cartridge drive, and loads the data cartridge into the data cartridge drive.

Moreover, the data storage device may also receive, from the host computer, a request to return a previously retrieved data cartridge to the storage element. The storage device determines, based on such a request, a data cartridge position for storing the foregoing data cartridge. The movable cartridge access device then retrieves the data cartridge from the input/output component, moves the data cartridge to the determined data cartridge location and loads the data cartridge into the cartridge storage element.

Typically, the data storage device further comprises a controller, which is configured to receive requests, such as the cartridge retrieval requests described above, from the host computer and manage the operation of the device in response to the requests. During operation of the storage device, the controller typically retains operational information that is used by the controller for operation and management of the device. When the controller fails, the controller may be replaced. However, the configuration data accumulated by the controller for routing data to the drives and/or the picker may be lost and unrecoverable, depending upon the type of failure that occurs. The loss of such data sometimes makes restarting operation and/or evaluating past performance of the data cartridge storage system difficult and problematic.

SUMMARY OF THE DISCLOSURE

The embodiments of the present disclosure pertain to cartridge storage systems and methods that store operational data to a removable nonvolatile memory component.

One embodiment of a cartridge storage system storage system comprises at least one peripheral device that controls access to a system component of the storage system and memory storing configuration data indicative of a configuration of the peripheral device. The system further has logic that automatically configures a replacement peripheral device of the at least one peripheral device based upon the stored configuration data.

Another embodiment encompasses a storage system management method comprising configuring at least one peripheral device of a storage system for controlling access by a host computer to a system storage device, storing configuration data indicative of a configuration of the peripheral device in memory, and configuring a replacement peripheral device of the at least one peripheral device based upon the stored configuration data.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the figures.

DETAILED DESCRIPTION

Figure 1:
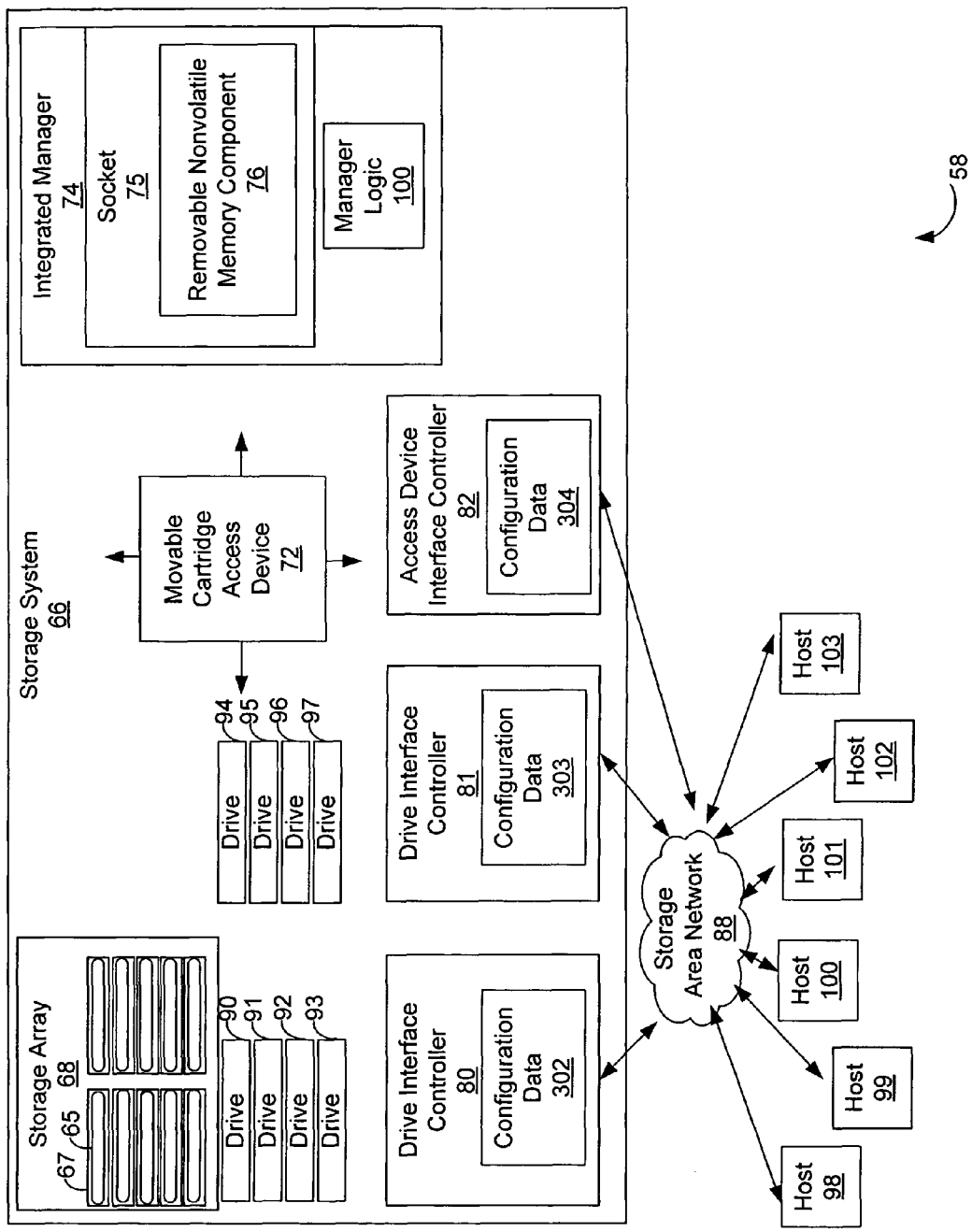
FIG. 1 is a block diagram illustrating an exemplary embodiment of a data storage system in accordance with the present disclosure.

In general, embodiments of the present disclosure pertain to cartridge storage systems and methods that retain configuration data of peripheral devices in removable nonvolatile memory components. A cartridge in accordance with various exemplary embodiments of the present disclosure can comprise a data cartridge, such as, for example, a tape cartridge, compact disc read only memory (e.g., CD-ROM), or diskette. In addition, cartridges can comprise containers, such as vials for storing substances. Moreover, an embodiment of a cartridge storage system that stores and transports data cartridges will be described in more detail hereafter with reference to FIG. 1 and FIG. 2. However, it should be noted that, in other embodiments, the cartridge storage system may store and transport other types of cartridges.

A cartridge storage system in accordance with an embodiment of the present disclosure comprises a plurality of peripheral devices, e.g., interface controllers, and removable nonvolatile memory component (RNMC). During operation, configuration data related to the peripheral devices is stored in the RNMC. "Configuration data" generally refers to data that can subsequently be used to reconfigure one or more of the peripheral devices when the peripheral device associated with the configuration data malfunctions. In this regard, the configuration data may comprise a unique identifier, e.g., a world wide name (WWN), associated with devices, e.g., host computers, that are privileged to access the peripheral device. Further, the configuration data may comprise limitations associated with the particular WWN that accesses the peripheral device. For example, a host computer that has access through the peripheral device to the storage system may be limited to a particular subset of the cartridges. Thus, the configuration data may further comprise data indicative of the subset of the storage device to which the particular host computer has access. Further, the configuration data may comprise information germane to the specific configuration of the storage device related to each of the host computers that has privilege to access the data storage system, e.g., each host computer may access cartridges within the storage system with a series of virtual identifiers identifying a partitioned subset of the storage device, and such information can be stored as configuration data. In other examples, other types of information may be indicated by the configuration data.

Moreover, in the event that one or more of the peripheral devices malfunctions, the peripheral device may be replaced. The storage system may then reconfigure the peripheral device based upon the configuration data stored in the RNMC. Further, if the storage system malfunctions, a second storage system mirroring the hardware components of the malfunctioning storage system may be configured to operate in the malfunctioning system's place. In this regard, the RNMC may be inserted into the second system, and the configuration data may be used to configure the second system without losing the configuration data of the malfunctioning system. Note that "world wide name" refers to a unique 48 or 64 bit identifier assigned by a recognized naming authority that identifies a connection or a set of connections to a storage area network. Such identifiers are often 48 or 64 bits, but other bit lengths are possible in other embodiments.

A cartridge storage system 58 for retaining configuration data in accordance with one embodiment of the present disclosure is depicted in FIG. 1. The system 58 preferably comprises one or more host computers 98-103 and a storage device 66 connected via a storage area network 88 for communicating there between. The storage device 66 comprises a storage array 68 of storage elements 67 for storing one or more data cartridges 65. Further, the storage device 66 comprises a plurality of drives 90-97 for receiving one or more of the cartridges 65. Note that each of the drives 90-97 may be associated with a unique identifier, e.g., a WWN, which is described further herein.

The storage device 66 further comprises one or more interface controllers 80-82, which provide access to one or more components of the storage device 66. Further, the storage device 66 comprises a movable cartridge access device 72. Note that, upon installation, each of the interface controllers 80-82 is provided a unique identifier, e.g., a WWN, which uniquely identifies the particular controller.

Each of the interface controllers 80-82 comprises configuration data 302-304. Such configuration data is described in more detail hereinabove and throughout. Notably, however, the configuration data 302-304 defines, by unique identifier, which host computers 98-100 may access the storage device 66 through the interface controllers 80-82. Further, the configuration data 302-304 may further comprise mappings (not shown) that indicate other unique identifiers associated with other components that may be accessed by a host computer 98-100 in the storage device 66.

Upon command, the movable cartridge access device 72 may retrieve one of the cartridges 65 from the storage element 68 and load the retrieved cartridge 65 in one or more drives 90-97. Further, upon command, the movable cartridge access device may retrieve one of the cartridges 65 from one of the drives 90-97 and reload the retrieved cartridge 65 to storage element 68.

Each of the interface controllers 80-82 is associated with one or more particular devices within the storage device 66. For example, in the exemplary embodiment depicted in FIG. 1, drive interface controller 80 controls access to drives 90-93, drive interface controller 81 controls access to drives 94-97, and access device interface controller 82 controls access to the movable cartridge access device 72. The movable cartridge access device 72 may be, for example, a robotic arm that is capable of moving to retrieve and load cartridges 65 in the storage elements 67 and the drives 90-97. Other types of devices may be used to implement the device 72 in other examples.

Furthermore, WWNs may be used to uniquely identify virtual devices. For example, the storage array 68 may be divided into virtual devices identified by WWNs or the movable cartridge access device 72 may have one or more virtual devices associated with it. In this regard, the resources of the storage device 66 may be partitioned into virtual devices for access through the interface controllers 80-82.

Each of the drive interface controllers 80 and 81 provides access to its associated drives 90-93 and 94-97, respectively. In addition, each of the drive interface controllers 80 and 81 allows access to its associated drives 90-93 and 94-97, respectively, for a designated set of host computers. For example, interface controller 80 may allow access to drives 90-93 only for host computers 98-100, and interface controller 81 may allow access to drives 94-97 only for host computers 101-103. Note that while three host computers 98-100 and 101-103 are shown for each interface controller 80 and 81, respectively, more or less than three may be allowed to access the storage device 66 through the interface controllers 80 and 81. For example, in one exemplary embodiment, up to 250 host computers may be allowed to access the storage device 66 through interface controller 80, and up to 250 host computers may be allowed to access the storage device 66 through the interface controller 81. Such is discussed in more detail with reference to FIG. 2.

The association of the drive interface controllers 80 and 81 with their subset of host computers 98-100 and 101-103, respectively, may be effectuated a number of ways. For example, when each of the interface controllers 80 and 81 are installed in the storage device 66, each of the controllers 80 and 81 may be configured with the WWNs associated with those host computers 98-100 or 101-103 that each is to service during operation. In addition, a user (not shown) may configure the interface controllers 80-81 after installation by connecting to the controllers 80-82 over the network 88 and editing and/or adding additional information for controlling the interface controllers 80-81. In another embodiment, a user may access the integrated manager 74 and provide configuration data 302-304 for each of the interface controllers 80-81. The manager logic 100 saves the provided configuration data 302-304 to their respective controllers 80-82 and stores the configuration data 302-304 in the removable non-volatile memory component 76, which is described further herein with reference to FIG. 2.

Notably, each of the devices within the system 58 is associated with a unique identifier, e.g., a WWN, as described hereinabove. Thus, during operation, the host computer 98-103 may read and/or write data to one or more of the cartridges 65 via the storage area network 88 using each device's unique identifier. In this regard, the host computer 98-103 may issue a command identifying a unique identifier corresponding to one of the drive interface controllers 80 and 81 or the access device interface controller 82. As an example, the host computer 98 may need to read/write to one of the cartridges 65. Thus, the host computer 98 formulates a command identifying the access device interface controller 82 via its unique identifier. Further, the command may identify a request that the movable device 72 retrieve a particular cartridge 65, which may be identified in the command by the cartridge's unique identifier, e.g., a barcode, from the storage array 68 and load the particular cartridge 65 in drive 90, which may also be identified in the command by its unique identifier. Note that prior to issuing such a command, the host computer 98 may first request status of the access device 72 to determine its relevant location and/or operation. Furthermore, the host 98 may also perform an operation for retrieving and storing unique identifiers associated with those devices to which the host 98 may need to communicate.

The host computer 98 transmits a command identifying the unique identifier, e.g., a WWN, which identifies the interface controller 82. The command to the interface controller 82 requests that the movable cartridge access device 72 retrieve the particular cartridge 65 from the storage element 67 and load the cartridge in drive 90, which is also identified by its unique identifier, e.g., its WWN.

The interface controller 82 transmits the command received from the host computer 98 to the movable cartridge access device 72 instructing it to retrieve the particular cartridge 65 and load the cartridge in drive 90. Upon completion, the interface controller 82 transmits a "load successful" message to the host 98 by transmitting the message to the host computer's unique identifier, e.g., its WWN.

Upon notification of success, the requesting logic 62 of the host computer 98 may transmit a read request to the interface controller 80 by transmitting the request to the interface controller's WWN. Further, in the read request, the requesting logic 62 identifies drive 90 by its WWN, so that the interface controller 80 can identify which drive 90-93 that it controls, is to be read. The host computer 98 may then access the data contained on the cartridge 65 currently loaded in the cartridge drive 90.

As will be described further herein, each interface controller 80-81 preferably comprises configuration data that identifies those unique identifiers that identify devices, e.g., host computers 98-103, that are privileged to access the interface controller 80-81. Further, the configuration data comprises mappings of additional component unique identifiers that map to host computer identifiers identifying to which components the host computer 98-103 has access.

The storage device 66 further comprises an integrated manager 74 for controlling various aspects of the operation of the storage device 66. The integrated manager 74 preferably comprises a socket 75 and manager logic 100. An RNMC 76 is coupled to the socket 75, and the socket 75 conductively connects the RNMC 76 with other components of the integrated manager 74.

The RNMC 76 stores the configuration data 302-304, or a portion of the configuration data, related to each interface controller 80-82. In this regard, the RNMC stores unique identifiers for each host computer 98-103 that has access to the storage device 66 through the particular interface controller. Further, the RNMC stores configuration data associated with any virtual devices to which each host computer 98-103 has access. Other configuration data may include, for example, data identifying one or more subsets of the cartridges 65 and which of the host computers 98-103 have access to which subset of cartridges. In this regard, the storage system 58 may restrict access of data to identified host computers.

As described hereinabove, the configuration data may also include unique identifiers associated with virtual devices (not shown) to which the host computer 98-103 may have access, as described further herein. Such virtual devices may be configured specifically for a particular host computer 98-103. For example, storage array 68 may be partitioned into separate "virtual devices" comprising one or more cartridges, e.g., 4 cartridges. The 4-cartridge virtual device may be associated with a unique identifiers, and the host computer 98-100 may access, for example, the 4-cartridge virtual device, by identifying the virtual device unique identifier and by identifying which cartridge in the virtual device that the host computer 98-100 desires to access, e.g., cartridge 1-4.

The operation of the integrated manager 74 is preferably controlled via the manager logic 100, which may be implemented in hardware, software, or a combination thereof. In this regard, the manager logic 100 may be configured to track and save, to the RNMC 76, configuration data 302-304 that can be used when peripheral devices, e.g., interface controllers 80-82, are replaced.

As described hereinabove, the manager logic 100 may retrieve configuration data from each of the devices 80-82 and save such retrieved data to the RNMC 76. However, in another embodiment, a user (not shown) accesses the integrated manager 74 via a graphical user interface (not shown) over the network 88. The user enters the configuration data 302-304 in the graphical user interface, and the manager logic 100 transmits the configuration data 302-304 to each respective interface controller. The manager logic 100 also stores the configuration data 302-304 to the RNMC 76, as described hereinabove.

Figure 2:
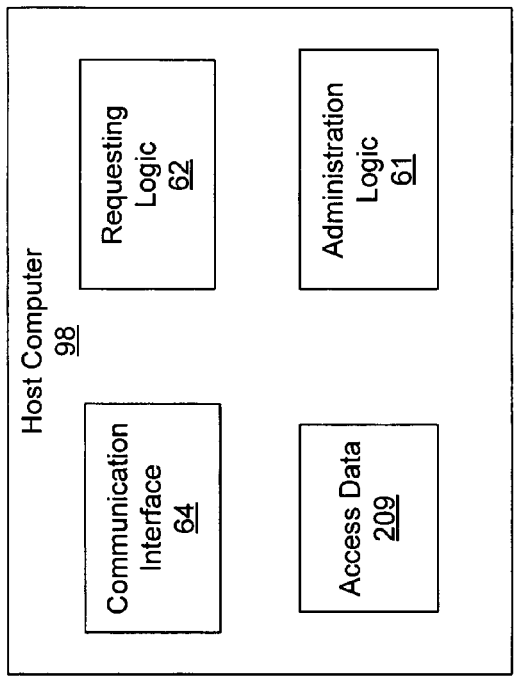
FIG. 2 is a block diagram illustrating an exemplary host computer depicted in FIG. 1.

FIG. 2 depicts an exemplary host computer 98. The host computer 98 preferably comprises a communication interface 64 for communicating with the storage device 66 via the storage area network 88. The host computer further comprises requesting logic 62. The requesting logic 62 initially performs a device lookup operation that may query a plurality of devices on the network 88 to determine the available devices for use by the host 98. For example, the host 98 may have permission to access only a subset of the cartridges 65 through a designated interface controller, e.g., interface controller 80 (FIG. 1).

Thus, the requesting logic 62 retrieves unique identifiers associated with those devices, e.g., interface controllers, access devices, and/or cartridges, to which host 98 has access and stores such information as access data 209. In this regard, the requesting logic 62 may request the unique identifier associated with the particular interface controller 80-82 to which the host is assigned. For example, the host 98 may be assigned to interface controller 80 for requesting access to one or more of the drives 90-93.

Furthermore, during operation, the requesting logic 62 transmits commands, e.g., cartridge load commands, read commands, and/or write commands, over network 88 via communication interface 64. In so issuing commands, the requesting logic identifies the device, e.g., the interface controllers 80-82, with which it needs to communicate to perform a particular task. For example, the requesting logic 62 may transmit a command to the unique identifier of the access device interface controller 82 to retrieve a cartridge 65 and load the cartridge in drive 91, which the requesting logic 62 also identifies by its unique identifier.

Once the cartridge 65 is loaded, the requesting logic 62 may issue a read command to the interface controller 80 by addressing the interface controller's unique identifier and the unique identifier associated with drive 91.

The host 98 may further comprise administration logic 61. The administration logic 61 may allow a user (not shown) to specifically configure the storage device 66 for customized use by the host 98. For example, the administration logic 61 may enable the user to identify a portion of the cartridges 65 as a virtual device for its use and associate with the virtual device defined by the portion of cartridges 65 a unique identifier, e.g., a WWN. Thus, when the requesting logic 62 requests that a particular cartridge 65 be loaded into a drive 90-97, such request need be accompanied by the unique identifier associated with the virtual device.

Such information provided by the administration logic 61 may then be stored as configuration data on the host computer's interface controller 80 through which it accesses the storage device. Furthermore, the manager logic 100 (FIG. 1) stores the configuration data in the RNMC 76.

Figure 3:
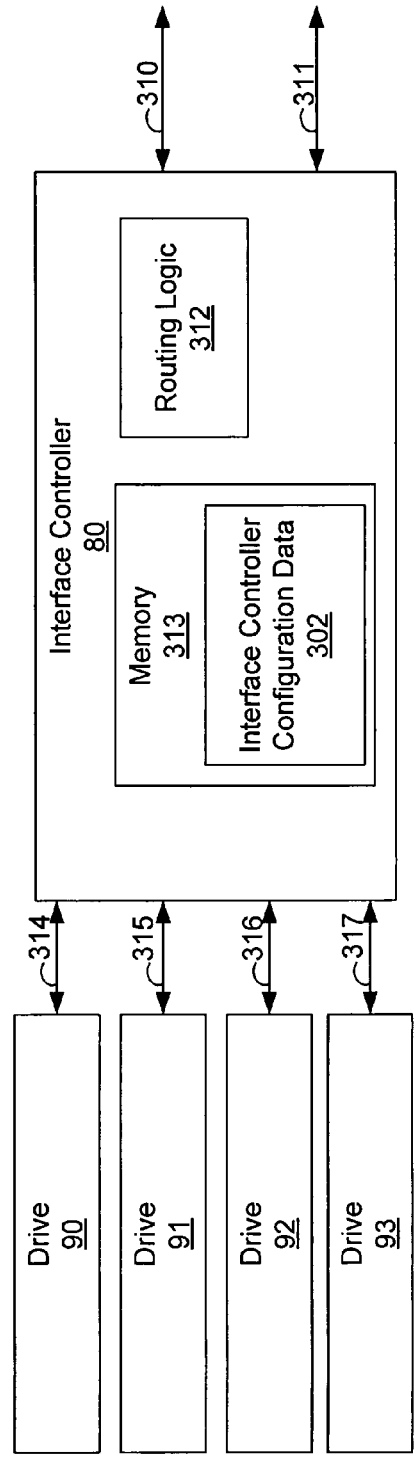
FIG. 3 is a block diagram illustrating an exemplary interface controller as depicted in FIG. 1.

FIG. 3 depicts an exemplary interface controller 80 in accordance with an embodiment of the present disclosure. The interface controller 80 comprises memory 313 and routing logic 312. Memory 313 stores interface controller configuration data 302, which is described further throughout.

The interface controller 80 comprises two data lines 310 and 311 for receiving and/or transmitting data from one or more host computers 98-103. As an example, interface controller 80 may have a unique identification number of 0×50060b0000000011, and each of the drives 90-93 that the interface controller can access has unique identification numbers 0×50060b0000000012, 0×50060b0000000013, 0×50060b0000000014, and 0×50060b0000000015, respectively. Further, the interface controller 80 maybe configured to service only those requests received from host computers 98-100. As described hereinabove, each interface controller 80-82 may be configured to service a maximum number of host computers, e.g., 250 host computers.

In such an example, the host computer 98 may transmit a request to the interface controller 80 to read from drive 91 identified by 0×50060b0000000013. As described hereinabove, prior to transmitting a read command, the host computer 98 has requested that a particular cartridge be loaded in drive 91.

The routing logic 312 receives the request from the host computer 98. The routing logic 312 may identify from the interface controller configuration data 302 whether the host computer 98 is one that the interface controller 80 has been configured to service. Further, the routing logic 312 may determine whether the host computer 98 can access the cartridge in the drive 91 by ensuring that the host computer 98 is associated with the unique identifier of the drive 91 in the interface controller configuration data 302.

Further, the interface controller 80 comprises four data lines for transmitting data to four cartridge drives 90-93. In this regard, the routing logic 312 transmits the received command to the drive 91 via the data line 315. The routing logic 312 then uses the lines 310 and 311 to transmit the requested data to the host computer 98, if the command was to read data from the drive 91. Further, the routing logic 312 uses the lines 310 and 311 to receive data from the host computer 98, if the command was to write data to the drive 91.

As described hereinabove, other types of data may be included in the interface controller configuration data. For example, with respect to the access device interface controller 82, data related to the storage array 68 may further be stored in the interface controller 82. In this regard, as described hereinabove, if the host computer 98 has preconfigured, for example, virtual devices associated with the access device 72 or the storage array 68, then the commands received from the host computer will be reconciled with any unique identifiers stored in the interface controller configuration data 302 associated with the virtual devices. Such an example is described further herein with reference to FIGS. 5 and 6.

Figure 4:
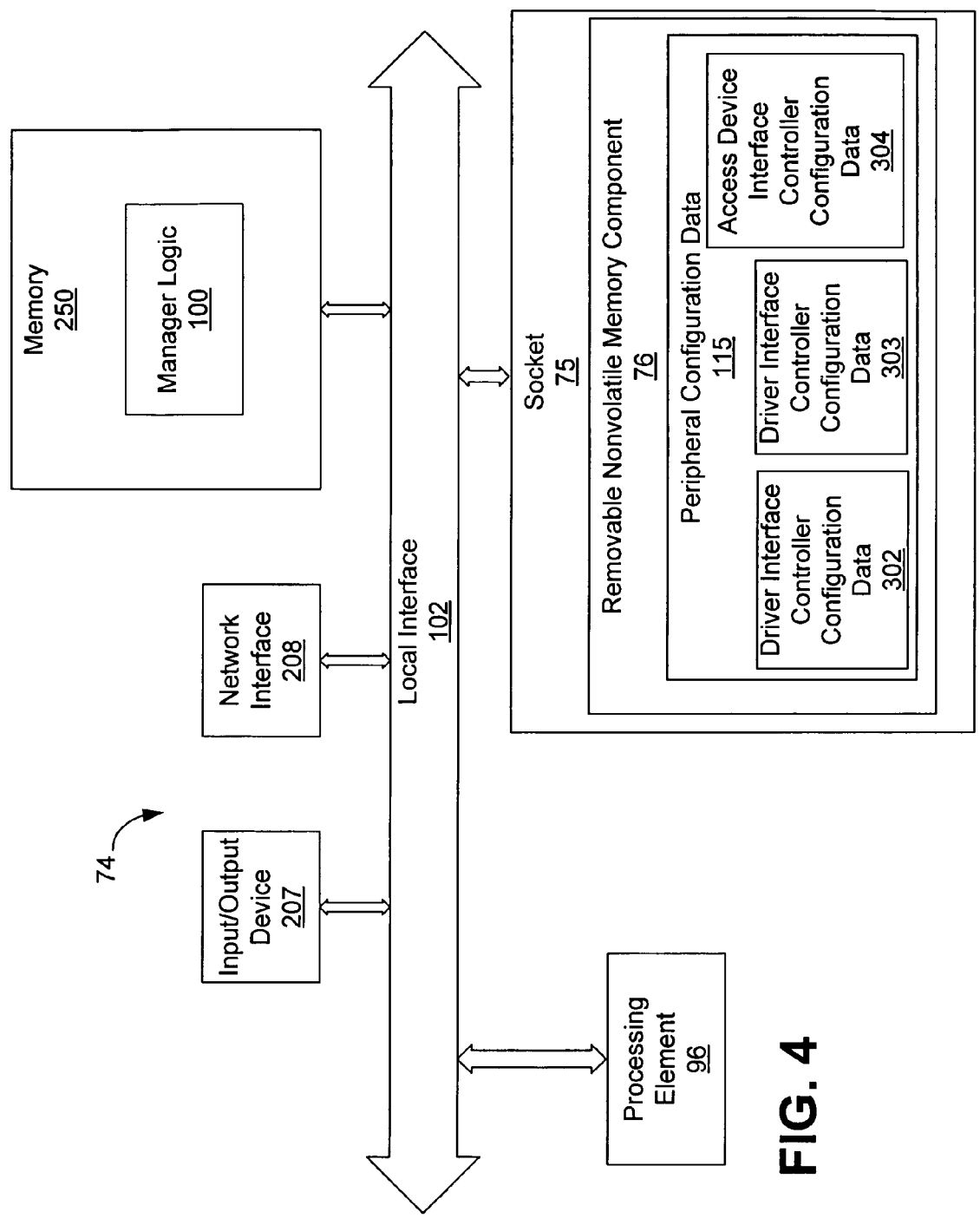
FIG. 4 is a block diagram illustrating an exemplary integrated manager as depicted in FIG. 1.

FIG. 4 depicts an exemplary embodiment of the integrated manager 74. The integrated manager 74 of FIG. 4 comprises the manager logic 100 and the socket 75. The manager logic 100 is preferably implemented in software and stored in memory 250. However, in other embodiments the manager logic 100 may be implemented in hardware or a combination of hardware and software, and/or the manager logic 100 may reside within data storage components other than the memory 250 shown by FIG. 4.

The manager logic 100, when implemented in software, can be stored and transported on any computer-readable medium for use by or in connection with an instruction execution system device that can fetch and execute instructions. In the context of this document, a computer-readable medium can be any means that can contain, store, communicate, propagate, or transport a program for use by or in connection with an instruction execution device. The computer-readable medium can be, for example but not limited to, an electronic, magnetic, optical, electromagnetic, infrared, or semiconductor system apparatus, device, or propagation medium.

Each of the components of the manager 74 may reside on a single printed circuit board (PCB) (not shown). However, in other embodiments, the integrated manager components may reside on multiple PCBs and/or be interconnected via other types of known or future-developed devices. The integrated manager 74 can interface with the other components of the storage device 66 via an expansion slot, as a daughterboard or as a controller board. Note that the RNMC 76 is preferably implemented as compact flash memory, and the socket 75 may comprise smart media card connectors, compact flash card connectors, secure digital card connectors, multi media card connectors, memory stick card connectors, or other known or future-developed chip interfaces that enable insertion and removal of the RNMC 76.

The embodiment of the integrated manager 74 depicted in FIG. 4 comprises one or more system processing elements 96, such as a digital signal processor (DSP) or a central processing unit (CPU), that communicate to and drive the other elements within the manager 74 via a local interface 102, which can include one or more buses.

The integrated manager 74 further comprises an input/output device 207. The input/output device 207 is preferably a driver for communicating with, for example, the interface controllers 80-82, the access device 72, or any other components within the device 66.

The RNMC 76 preferably stores configuration data, as described hereinabove, including, but not limited to driver interface controller configuration data 302, driver interface controller configuration data 303, and access device interface controller data 304.

The integrated manager 74 further comprises a network interface 208. The network interface 208 provides access to the integrated manager 74 via a network (not shown). In this regard, the administration logic 61 (FIG. 2) may comprise a graphical user interface (not shown) in which a user (not shown) of the host computer 98 may enter the configuration data 302-304 corresponding to one or more of the interface controllers 80-82. The manager logic 100 receives the configuration data 302-304 via the network interface 208 and transmits the configuration data 302-304 to the corresponding interface controllers 80-82. Further, the manager logic 100 stores the configuration data 302-304 as peripheral configuration data 115. In this regard, the manager logic 100 stores each of the interface controller's configuration data 302-304 in the RNMC 76.

Figure 5:
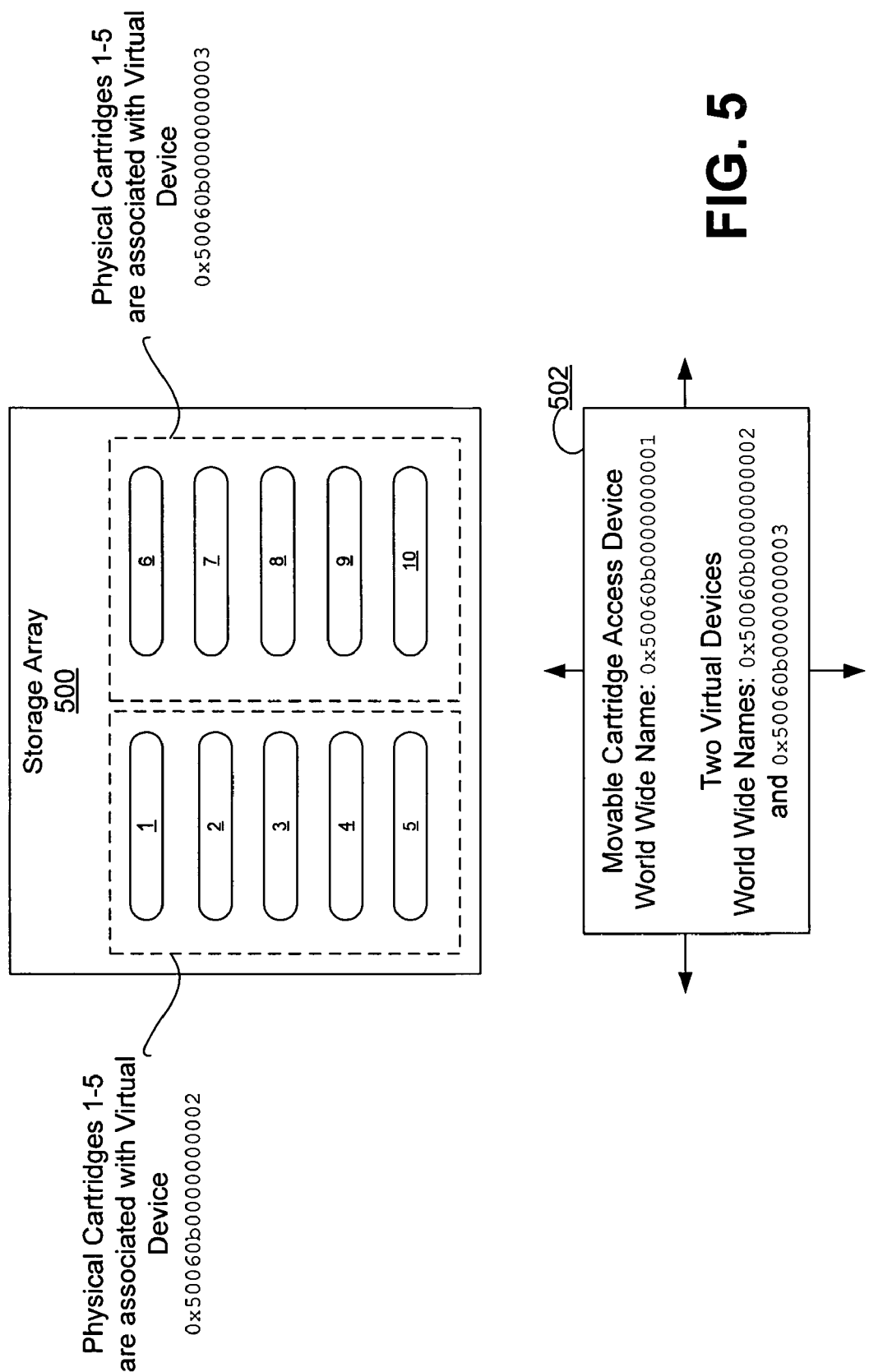
FIG. 5 illustrates an exemplary storage array divided into virtual devices to be used to define configuration data as depicted in FIG. 1.

FIG. 5 illustrates exemplary configuration data 304 that may be stored on the access device interface controller 82 and the RNMC 76. FIG. 5 depicts a storage array 500 that is substantially similar to the storage array 68 described hereinabove with reference to FIG. 1. In this regard, the storage array 500 comprises a plurality of cartridges 1-10.

FIG. 5 further depicts a movable cartridge access device 502 having a unique identifier of 0x50060b0000000001, which operates substantially similar to the access device 72 depicted in FIG. 1. However, through configuration by the administration logic 61 or some other method, the movable cartridge access device 0x50060b0000000001has been defined as two virtual devices 0x50060b0000000002 and 0x50060b0000000003. For illustration purposes, assume that the virtual device 0x50060b0000000002 is defined for host computer 98 and is associated with physical drives 1-5. Further, assume that the virtual device 0x50060b0000000003 is defined for host computer 99 and is associated with physical drives 6-10. Notably, physical cartridges 1-5 are associated with virtual device unique identifier 0x50060b0000000002, and physical cartridges 6-10 are associated with the virtual device unique identifier 0x50060b0000000003. Such configuration data 304 (FIG. 1) is stored in the access device interface controller 82 (FIG. 1).

Thus, in order for host computer 98 to request that the access device 502 load cartridge 3 in one of the drives 90-93, the requesting logic 62 transmits a request to the unique identifier 0x50060b0000000002 to load cartridge 3 associated with 0x50060b0000000002 to one of the drives 90-93. Further, in order for host computer 99 to request that the access device 502 load cartridge 6 in one of the drives 90-93, the requesting logic 62 transmits a request to the unique identifier 0x50060b0000000003 load cartridge 1 associated with 0x50060b0000000003 to one of the drives 90-93. Notably, because the access device 502 has been partitioned into two virtual devices 0x50060b0000000002 and 0x50060b0000000003, the requesting logic 62 no longer requests cartridge 6 using the movable cartridge access device WWN, 0x50060b0000000001. Instead, the requesting logic 62 requests cartridge 1 of the virtual device WWN, 0x50060b0000000003.

Figure 6:
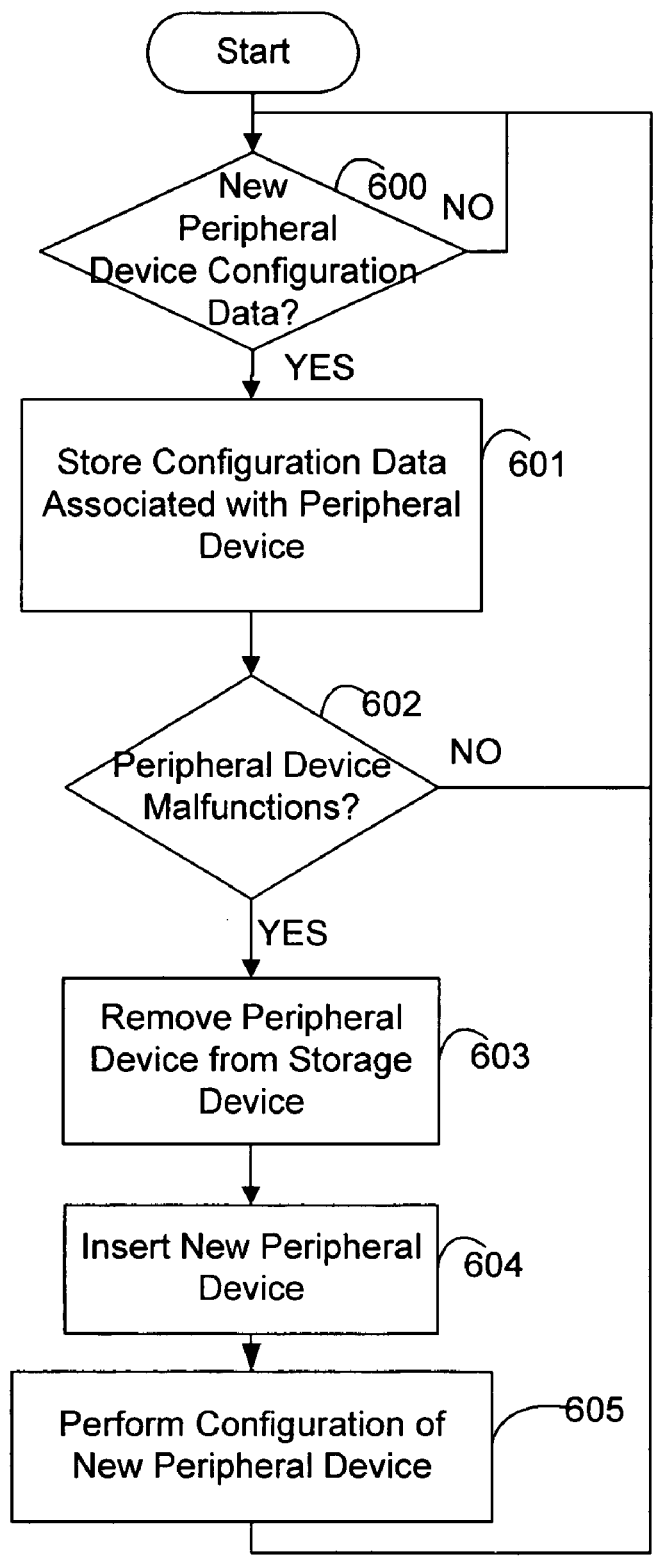
FIG. 6 is a flowchart illustrating an exemplary method of operation of the storage device depicted in FIG. 1.

FIG. 6 depicts an exemplary operational methodology for the storage device 66. When a peripheral device, e.g., an interface controller 80-82, is installed in the storage device 66, a user may configure the peripheral device with configuration data 302 (FIG. 3) that defines a plurality of unique device identifiers, e.g., WWNs, associated with a plurality of devices that have privilege to use the peripheral device, as described hereinabove with reference to FIGS. 1 and 2.

As described throughout, the substantive content of the configuration data 302 may vary depending upon the type of interface controller 80-81. In this regard, the configuration data 302 enables the peripheral device to determine whether a host computer 98-103 can access a particular device. However, generally, the configuration data comprises data indicative of unique identifiers associated with a plurality of host computers 98-103 that have rights to use the peripheral device. Further, the configuration data 302 may include mappings of virtual devices, i.e., the virtual devices' unique identifier, associated with a host computer unique identifier.

Furthermore, throughout operation, the substantive content of the configuration data may evolve. In this regard, the administration logic 61 (FIG. 2) of a host computer 98-103 may modify the configuration data 302-304 via the administration logic 61, including the host computer's virtual drives. Further, a host computer 98-103 may be added or deleted from the configuration data 302 of a particular interface controller 80-82.

Thus, the manager logic 100 (FIG. 4) may periodically receive, via the integrated manager network interface 208 (FIG. 2) changes to the configuration data 302-304 of the interface controllers 80-82 (FIG. 1). If the manager logic 100 determines that a modification has been made to the substantive content of the configuration data 302-304 of an interface controller 80-82, respectively, as indicated in block 600, then the manager logic 100 stores in the RNMC 76 (FIG. 1) the configuration data 302-304 for the particular peripheral device, as indicated in block 601 and transmits the configuration data 302-304 to its appropriate interface controller 80-82. If no modification has been made, then the manager 100 does not make any modifications to the RNMC 76.

If, during operation, one of the peripheral devices 80-82 malfunctions, as indicated in 602, then a user (not shown) removes the peripheral device 80-82, as indicated in block 603. Further, the user then inserts a new peripheral device into the slot (not shown) of the malfunctioning peripheral device 80-82, as indicated by block 604.

The manager logic 100 then configures the new peripheral device with the configuration data 302-304 corresponding to the peripheral device that was replaced, as indicated in step 605. Notably, the manager logic 100 may receive a signal from the new peripheral device or the manager logic 100 may continue to poll the plurality of peripheral device 80-82. Thus, the manager logic 100 will determine that configuration data 302-304 is to be used to configure the new peripheral device.

The invention claimed is:

1. A cartridge storage system comprising:
a storage array to store cartridges;
cartridge drives;
a movable cartridge access device;
a plurality of peripheral devices to control remote access to the cartridges based on respective plural configuration data indicating which remote host computers are authorized to access the cartridges, each of the peripheral devices having memory to store a respective one of the plural configuration data, wherein each of the peripheral devices is configured to instruct the movable cartridge access device to retrieve a corresponding one of the cartridges from the storage array and load the corresponding cartridge in a respective one of the cartridge drives in response to a request from a remote host computer determined by the corresponding peripheral device, based on the respective configuration data, to be authorized to access the corresponding cartridge;
a removable nonvolatile memory external to the peripheral devices and the cartridges, the removable nonvolatile memory to simultaneously store additional multiple configuration data based on respective ones of the plural configuration data, each of the additional multiple configuration data identifying the respective remote host computers authorized to access corresponding cartridges; and
logic configured to update the additional multiple configuration data based on changes for respective ones of the plural configuration data and to reconfigure a replacement peripheral device of a respective one of the peripheral devices based upon a respective one of the stored additional multiple configuration data.

2. The cartridge storage system of claim 1, wherein each of the plural configuration data has a unique identifier identifying a respective remote host computer determined by the respective peripheral device to be authorized to access a corresponding one of the cartridges.

3. The cartridge storage system of claim 1, further comprising a socket, wherein the removable nonvolatile memory is inserted into the socket.

4. The cartridge storage system of claim 3, further comprising a network interface, wherein the logic is configured to receive a configuration data update via the network interface and to update a respective one of the additional multiple configuration data based on the configuration data update, the logic further configured to transmit the configuration data update to a respective one of the peripheral devices to enable the respective peripheral device to update the respective configuration data stored on the respective peripheral device based on the configuration data update.

5. The cartridge storage system of claim 4, wherein the socket, the logic, and the network interface are integrated on a single printed circuit board.

6. The cartridge storage system of claim 1, wherein the plurality of peripheral devices are devices including respective interface controllers.

7. The cartridge storage system of claim 6, wherein the interface controllers are to control access of respective subsets of the cartridge drives.

8. The cartridge storage system of claim 1, wherein each of the plural configuration data further stores data associated with a virtual device to which a corresponding remote host computer has access, the virtual device having plural cartridges.

9. The cartridge storage system of claim 1, wherein each of the additional multiple configuration data is a copy of at least a portion of a respective one of the plural configuration data.

10. A data storage method, comprising:
storing cartridges in a storage array;
storing plural configuration data in respective peripheral devices, each of the plural configuration data identifying remote host computers authorized to access the cartridges;
receiving requests from the remote host computers;
determining, in response to the requests and based on the configuration data stored in respective ones of the peripheral devices, whether the requesting remote host computers are authorized to access respective ones of the cartridges;
transmitting commands from the respective peripheral devices to a movable cartridge access device in response to the receiving and the determining;
retrieving, via the movable cartridge access device, corresponding cartridges and loading the corresponding cartridges to respective cartridge drives in response to the commands;
simultaneously storing additional multiple configuration data in a removable nonvolatile memory external to the peripheral devices and the cartridges, the additional multiple configuration data indicating whether respective remote host computers are authorized to access the cartridges;
replacing a particular one of the peripheral devices with a replacement peripheral device; and
configuring the replacement peripheral device based upon a corresponding one of the stored additional multiple configuration data.

11. The method of claim 10, further comprising determining whether a respective one of the plural configuration data has been modified.

12. The method of claim 11, further comprising modifying the respective one of the additional multiple configuration data in response to the modified configuration data.

13. The method of claim 10, further comprising detecting the replacing.

14. The method of claim 13, wherein the configuring is performed in response to the detecting.

15. The method of claim 10, further comprising:
reading the cartridges via the cartridge drives; and
transmitting data read via the reading from the peripheral devices to requesting remote host computers.

16. The method of claim 10, further comprising:
replacing a second one of the peripheral devices with a second replacement peripheral device; and
configuring the second replacement device based upon another corresponding one of the stored additional multiple configuration data.

17. The method of claim 10, wherein the peripheral devices are devices including respective interface controllers.

18. A cartridge storage system comprising:
a storage array operable to store cartridges;
a cartridge drive;
a movable cartridge access device;
a first peripheral device operable to control remote access to the cartridges based on first configuration data indicating which remote host computers are authorized to access the cartridges, the first peripheral device having memory operable to store the first configuration data, wherein the first peripheral device is configured to instruct the movable cartridge access device to retrieve one of the cartridges from the storage array and load the one cartridge in the cartridge drive in response to a request from a remote host computer determined by the first peripheral device, based on the first configuration data, to be authorized to access the one cartridge;
memory external to the first peripheral device and the one cartridge, the memory operable to store second configuration data based on the first configuration data, the second configuration data identifying the remote host computers authorized to access the one cartridge;
logic configured to update the second configuration data based on changes for the first configuration data and to reconfigure a replacement peripheral device of the first peripheral device based upon the stored second configuration data, wherein the memory external to the first peripheral device is a removable nonvolatile memory device; and
a second peripheral device operable to control remote access to the cartridges based on third configuration data indicating which of the cartridges are accessible to at least one remote host computer, the second peripheral device having memory operable to store the third configuration data, wherein the second peripheral device is configured to instruct the movable cartridge access device to retrieve at least one of the cartridges from the storage array based on the third configuration data, wherein the removable nonvolatile memory device is operable to store simultaneously fourth configuration and the second configuration data, the fourth configuration data based on the third configuration data and indicating which of the cartridges are accessible to the at least one remote host computer, and wherein the logic is configured to update the fourth configuration data based on changes to the third configuration data.

19. The cartridge storage system of claim 18, wherein the first and second peripheral devices are devices including respective interface controllers.

20. The cartridge storage system of claim 18, further comprising a socket, wherein the removable nonvolatile memory device is inserted into the socket.

* * * * *

UNITED STATES PATENT AND TRADEMARK OFFICE
CERTIFICATE OF CORRECTION

PATENT NO. : 8,370,574 B2
APPLICATION NO. : 11/451810
DATED : February 5, 2013
INVENTOR(S) : Curtis Ballard et al.

Page 1 of 1

It is certified that error appears in the above-identified patent and that said Letters Patent is hereby corrected as shown below:

In the Specifications:

In column 4, line 5, delete "element" and insert -- array --, therefor.

In column 4, line 8, delete "device" and insert -- device 72 --, therefor.

In column 4, line 10, delete "element" and insert -- array --, therefor.

Signed and Sealed this
Fourteenth Day of May, 2013

Teresa Stanek Rea
*Acting Director of the United States Patent and Trademark Office*